United States Patent [19]

Currah

[11] 4,410,105

[45] Oct. 18, 1983

[54] CABLE-DRIVEN ROTOR-PISTON DISPENSING APPARATUS AND METHOD OF OPERATING THE SAME

[76] Inventor: Ian E. Currah, 14 Eton Rd., Stratford-upon-Avon, England

[21] Appl. No.: 179,290

[22] PCT Filed: May 11, 1979

[86] PCT No.: PCT/GB79/00067

§ 371 Date: Dec. 19, 1979

§ 102(e) Date: Dec. 19, 1979

[87] PCT Pub. No.: WO79/01067

PCT Pub. Date: Dec. 13, 1979

[30] Foreign Application Priority Data

May 12, 1978 [GB] United Kingdom ............... 19401/78
May 12, 1978 [GB] United Kingdom ............... 19402/78
May 30, 1976 [GB] United Kingdom ............... 24435/78

[51] Int. Cl.³ .......................................... A01C 7/18
[52] U.S. Cl. .................................... 222/1; 222/611; 222/613; 222/336; 222/390; 222/392; 111/43; 111/44
[58] Field of Search ............... 222/390, 391, 608, 611, 222/613, 336, 392; 111/43, 46, 44, 51, 50

[56] References Cited

U.S. PATENT DOCUMENTS 1,423,932  7/1922  Garner .
1,495,626  5/1924  Wylie .
1,992,406  2/1935  Wartman .
2,390,969  12/1945  Traphagen .
2,618,414  11/1952  Matlas ................................. 222/320
3,774,819  11/1973  Bratton .............................. 222/391
3,993,226  11/1976  Pavenick ......................... 222/390 X

FOREIGN PATENT DOCUMENTS

2041    of 1912  United Kingdom .
418394  10/1934  United Kingdom .
944520  12/1963  United Kingdom .
955346   4/1964  United Kingdom .
1045732 10/1966  United Kingdom .
1391575  4/1975  United Kingdom .

*Primary Examiner*—Charles A. Marmor
*Attorney, Agent, or Firm*—Schwartz & Weinrieb

[57] ABSTRACT

Apparatus and method for dispensing a gel containing seeds for planting. A container (11) has a piston (13) driven by a lead screw (14) for expressing the gel through outlet (12). A line (17) is wound around a control rotor (16) and a free end is secured at a fixed location (19). As container (11) is moved away from location (19), line (17) unwinds and rotates rotor (16) to express the gel at a rate related to the movement of the container (11), so that the operator does not have to match the dispensing rate to the rate of movement. In other arrangements the container moves towards the fixed location, or between two fixed locations. Other metering members may replace the line. Materials other than seeds in gel may be dispensed.

30 Claims, 15 Drawing Figures

CABLE-DRIVEN ROTOR-PISTON DISPENSING APPARATUS AND METHOD OF OPERATING THE SAME

FIELD OF THE INVENTION

The present invention relates to an apparatus and method for dispensing material, and is concerned in particular, but not exclusively, with an apparatus and method for dispensing a gel containing seeds for planting.

BACKGROUND OF THE INVENTION

Most seed drills in common use dispense the seeds in a dry state and it is known to be a requirement to dispense the seeds at a rate which is matched to the forward speed of the seed drill moving over the ground so that the seeds are distributed evenly. It is also known that there are advantages in sowing seeds in a wet state, especially after they have been allowed to imbibe water for a specified time and to become partially germinated. The main advantage is that the seed can be partially or completely germinated under determined conditions before drilling either into the field, into seed boxes or into soil blocks, with the result that the crop growth is quicker, more controlled, and has a greater reliability of a viable plant at each required position. It is known to dispense seeds in this wet state by suspending the seed in a flowable, semi-liquid gel, for example provided by carboxymethyl cellulose. One simple method of dispensing such a gel is to contain the gel in a bag with an aperture at one end and to squeeze the bag so as to express the gel as a narrow trail of material in much the same manner as sugar icing is applied to cakes as a decoration. It is also known, as disclosed in U.K. patent specification No. 1,045,732 (Elliott), to dispense seeds in a gel by a mechanism secured to a mobile frame for movement over the ground the frame carrying a pumping arrangement for squeezing out a trail of gel at a rate related to the movement of the land wheels of the frame.

In operation however a number of disadvantages have been found with both the above methods of dispensing seeds in a gel. In the case of a simple manual method described, the operator has the difficult task of matching the rate of delivery of the gel to the rate of movement of the aperture over the ground (or other material to which the gel is being applied). In the case of the automatic frame mounted dispenser, the equipment is complicated and expensive and unsuitable for adaption to manual small scale use, for use in confined circumstances such as a greenhouse, seed boxes or small planting area. Furthermore inaccuracies can arise if slippage occurs between the land wheels and the ground since the amount of material delivered is related to the rotation of the ground wheels.

There are also known, for example as described in U.S. Pat. Nos. 1,423,932 (Garner) and No. 2,390,969 (Traphagen), mobile seed drills, known as check row planters, which operate by securing at one or more fixed locations spaced apart across a field a line on which are mounted equally spaced buttons. The mobile seed drill is driven across the field beside the line and a sensor arm engages the line and senses the passage of each button. As each button passes, it catches on the arm and imparts a motion to the arm which releases one or more seeds to be planted in the ground. Such check row planters operate to plant dry seeds discontinuously in response to discrete movements imparted to the sensor arm by the buttons.

Finally, there are also known a number of devices for dispensing material in the form of a paste or semi-liquid by manual rotation of a drive rotor to drive an output means which expels material from a container. Such devices have been used previously for dispensing materials such as toothpaste, cake icing or ceiling compounds, and examples are found in U.K. Pat. Nos. 944,520 (Crudgington) and 955,346 (Bouet). Use of such a device gives rise to the same difficulties discussed above in relation to dispensing seeds in a gel from a squeeze bag, that is to say that the operator has to match the rate of delivery to the speed of movement over the working surface.

OBJECTS OF THE INVENTION

It is an object of the present invention, at least in preferred embodiments thereof, to provide an apparatus and method suitable for dispensing seeds in a gel at a controlled rate by a simple and relatively inexpensive apparatus particularly, but not exclusively, suitable for manual use.

SUMMARY OF THE INVENTION

According to the present invention there is provided apparatus for dispensing material comprising a container for material, output means for expressing material from the container through an outlet of the container, a control rotor coupled to the output means in such a manner that rotation of the control rotor causes the output means to express material through the outlet, and an elongate metering member for effecting rotation of the rotor by engagement of the metering member with the rotor and by relative movement between the metering member and the container outlet.

It is to be appreciated that the elongate metering member may be arranged to effect rotation of the rotor in a number of different ways, for example by urging the rotor in rotation (either alone or in combination with other means for producing rotation), or by restraining rotation of the rotor and allowing controlled release of the restraint.

In preferred arrangements of the invention, the elongate metering member is adapted to engage with the rotor by wrapping around the rotor around at least an arc of a path around the rotor. However in other arrangements the metering member may engage with the rotor without such wrapping, for example by passing between a pair of pinch wheels one of which forms the rotor.

Conveniently the elongated metering member comprises a line, and in this specification there is meant by a line a string, cord, rope or like narrow, flexible elongate member suitable for wrapping around a control rotor.

It is preferred that the arrangement is such that in operation the rate of expression of material by the output means is substantially proportional to the rate of said relative movement between the rotor and the metering member. Furthermore it is preferred that the output means is arranged to express the material substantially continuously and uniformly in response to substantially continuous and uniform movement between the outlet and the metering member.

In one particularly preferred arrangement, the control rotor is arranged for the metering member to be wrapped repeatedly around the rotor to effect rotation of the rotor when in operation a free end of the metering member is secured at a fixed location and the rotor is moved relative to the fixed location. During this relative movement either the metering member may be unwound from the control rotor as the rotor is moved away from the fixed location, or alternatively the metering member may be wound upon the control member as the container is moved towards the said fixed location. In one preferred form, the metering member engages the rotor in such a manner as to effect rotation of the rotor by unwrapping of the metering member in operation, and there is provided means for re-winding the metering member onto the rotor after rotation of the rotor to express material from the container.

Thus dispensing apparatus may comprise a container for material, output means for expressing the material from the container through an outlet of the container, a control rotor coupled to the output means in such a manner that rotation of the rotor causes the output means to express material through the outlet, and an elongate metering member for effecting rotation of the rotor by engagement of the metering member with the rotor and by relative movement between the metering member and the container outlet, the elongate metering member being wrapped repeatedly around the rotor and a free end of the metering member being secured at a fixed location in an arrangement such that when in operation the outlet is moved relative to the fixed location the metering member effects rotation of the rotor and causes the output means to express material through the outlet.

In another form of the invention in its broadest aspect, the rotor is arranged for the metering member to engage with the rotor in such a manner as to leave both ends of the metering member free of the rotor, the arrangement being such as to effect rotation of the rotor when in operation the free ends of the metering member are secured respectively at two spaced apart locations and the rotor is moved from one fixed location towards the other. In such an arrangement the metering member may be wrapped around the control rotor for one or more turns or for less than 360° or the relatively movement may be such that the drive means merely moves along the metering member without wrapping or unwrapping.

In the arrangements which have been described with reference to one or more fixed locations, it is preferred that the arrangement is such that the quantity of material expressed by the output means is proportional to rectilinear movement of the container relative to the fixed location or locations.

In many of the forms of the invention, there may be provided means for urging the metering member against the rotor to produce or assist the said engagement of the metering member with the rotor. Such urging means may comprise for example a spring pressing the metering member against the rotor, or a further rotary member urged against the control rotor with the metering member sandwiched between the two rotary members.

The invention finds particular advantage where the control rotor is a drive rotor for driving the output means to express the material. Such a drive rotor may be arranged to be engaged with the metering member in such a manner as to be powered in operation by the said relative movement between the outlet and the metering member. In other arrangements however it is to be appreciated that the control rotor may merely assist or regulate the output means in expressing the material, and that the drive rotor similarly may be powered by other means than the metering member alone.

In one form of the apparatus of the invention, there may be provided drive means for driving the rotor in rotation, and the metering member may be engaged with the rotor in such a manner as to tend to restrain rotation of the rotor by the drive means and to effect the required rotation of the rotor in operation by controlled release of the restraint during the said relative movement between the outlet and the metering member. For example, the re-winding means may comprise a spring driven mechanism arranged to be wound up by the unwrapping of the metering member and to re-wind the metering member by unwinding of the spring driven mechanism.

In many of the forms of the apparatus, the output means may comprise a piston mounted on a lead screw for axial movement along the lead screw to express material through the outlet, the lead screw being coupled to the said rotor for rotation thereby.

It will be appreciated that in preferred embodiments of the invention as set out above, it is possible to arrange for material to be dispensed from the apparatus in such a manner that the quantity delivered along the path of movement of the container is constant per unit length of path travelled. In normal operation, in either mode, the line will be secured in a position such that movement of the container is in a straight line away from the fixed location (or where there are two locations in a second mode, in a straight line between the two locations) and in the preferred arrangements the quantity of material delivered per unit length of linear movement along the path of the container is independent of the speed of movement of the container. Thus in comparison with the manual operation in accordance with the prior art set out hereinbefore the operator in accordance with preferred arrangements of the present invention does not have to match the dispensing rate to his speed of movement of the container, nor does he have to move the container at a fixed rate. Variations in movement of the container are automatically compensated for by the varying speed of rotation of the drive rotor as the line unwraps.

There is also provided in accordance with the present invention a method of dispensing material comprising the steps of placing the material in a container having output means for expressing material from the container through an outlet of the container and a control rotor coupled to the output means in such a manner that rotation of the control rotor causes the output means to express material through the outlet, securing an elongate metering member at at least one fixed location, engaging the elongate metering member with the control rotor, moving the control rotor relative to the said fixed location or locations to produce a relative movement between the outlet and the metering member, and effecting rotation of the rotor by the engagement of the metering member with the rotor and by the relative movement between the metering member and the outlet.

Preferably the step of engaging the elongate metering member with the control rotor comprises wrapping the metering member around the rotor around at least an arc of a path around the rotor.

In one form of the method of the step of engaging the elongate metering member with the control rotor comprises wrapping the metering member repeatedly around the rotor, securing a free end of the metering member at a fixed location, and effecting the said rotation of the rotor by moving the rotor relative to the said fixed location.

Such a method may include the steps of moving the rotor away from the said fixed location and effecting the said rotation of the rotor by unwrapping the metering member from the rotor.

In another form the method may include the steps of engaging the elongate metering member with the control rotor in such a manner as to leave both ends of the metering member free of the rotor, securing the free ends of the metering member respectively at two spaced apart locations, and effecting the said rotation of the rotor by moving the rotor from one fixed location towards the other to cause the output means to express material through the outlet.

The method of the invention in all its aspects mentioned above finds particular advantage where the said control rotor is a drive rotor and the method includes the step of driving the output means to express the material by rotation of the drive rotor. Such a method may include the step of powering the rotation of the drive rotor by the said relative movement between the outlet and the metering member.

In another form, the method may include the step of applying to the control rotor a force tending to drive the rotor in rotation, and restraining rotation of the rotor by the engagement of the metering member with the rotor, the said step of effecting rotation of the rotor being carried out by controlled release of the restraint during the said relative movement between the outlet and the metering member.

Preferably in accordance with the invention the step of expressing the material is carried out in such a manner that the quantity of material expressed by the output means is substantially proportional to the said relative movement between the outlet and metering member.

Also preferably the method includes the step of expressing the material substantially continuously and uniformly in response to substantially continuous and uniform movement between the container outlet and the metering member.

In accordance with both the apparatus and method aspects of the invention, the invention finds particular application where the said material comprises seeds in a gel.

In this Specification where reference is made (with regard to the dispensing of seeds in connection with the present invention) to a gel, the term gel means any flowable, jelly-like, liquid or semi-liquid material which will maintain seeds in dispersion for the time of operation. The gel may have the properties of a jelly, or a viscose liquid, or any combination of these properties which will sufficiently suspend the seeds for the time of operation. The gel should be chosen so that the seeds remain dispersed for the required time and do not sink or otherwise congregate under the influence of gravity or any other factors within the required times.

BRIEF DESCRIPTION OF THE DRAWINGS

Embodiments of the present invention will now be described by way of example with reference to the accompanying drawings in which.

DETAILED DESCRIPTION OF THE ILLUSTRATED EMBODIMENTS

Referring firstly to FIGS. 1 and 2(a) to 2(d), apparatus embodying the invention for dispensing seeds in a gel comprises a container 11 for containing the gel to be dispensed. The container 11 has an outlet 12 for dispensing the material and has within the container 11 an output means for expressing material through the outlet 12, the output means comprising a piston 13 mounted on a lead screw 14. The lead screw 14 is coupled by way of a clutch 15 to a drive rotor 16, the rotor 16, clutch 15, and lead screw 14 all being mounted for rotation about a common axis. A line 17 passes into the container 11 through a hole 18 and is secured to and wound around the drive rotor 16. The other end of the line 17 is secured in operation (as will be described hereinafter) to a fixed location 19. The piston 13 is mounted in such a manner that rotation of the lead screw 14 causes the piston 13 to move axially along the container 11. Conveniently the friction fit of the piston seal allows the piston to move axially but not to rotate with the lead screw.

Referring now particularly to FIG. 2(a) to 2(d), the clutch 15 comprises a first rotor which in this case is formed by the drive rotor 16 and which has a transverse face 20 bearing a ratchet configuration comprising a plurality of depressions 21 positioned regularly around the edge of the transverse face 20. The clutch 15 also comprises a second rotor 22 coupled to a shaft 23 extending from the lead screw 14. The second rotor 22 has a pawl 24 pivoted about a pivot pin 25 for movement into and out of engagement with the ratchet configuration 21, the pawl being biassed towards the ratchet configuration by a spring 24' mounted on the rotor 22. The second rotor 22 is secured to the shaft 23 by a grub screw 26.

Figure 2A:
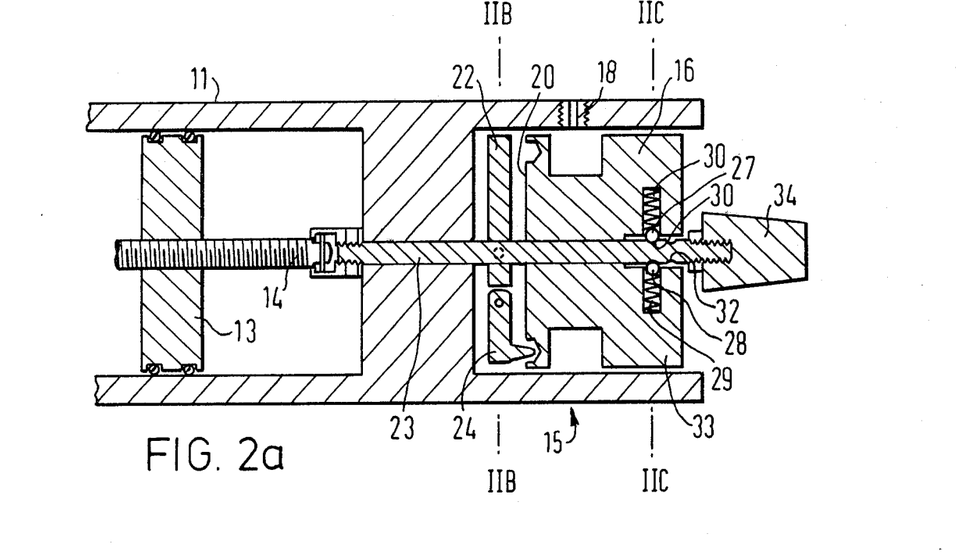
FIG. 2(a) is a longitudinal section along the axis of the apparatus shown in FIG. 1.
Figure 2B:
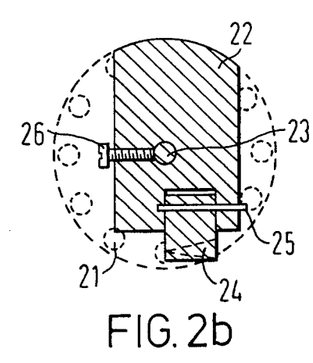
FIGS. 2(b) and 2(c) are cross-sections along lines IIB—IIB and IIC—IIC in FIG. 2(a) respectively.
Figure 2C:
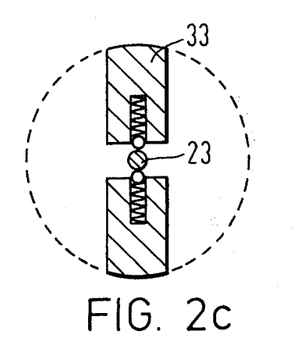

The drive rotor 16 is mounted on the shaft 23 for axial movement between a first position in which the pawl 24 is in operational relatinship with the ratchet configuration 21, and a second position in which the pawl 24 is in non-operational relationship with the ratchet configuration 21. These two positions are defined by ball biasing means 27 and 28 which are urged inwardly towards the shaft 23 by biasing springs 29 and 30 and which cooperate with grooves 31 and 32 on the shaft 23 defining the two said positions. The drive rotor 16 conveniently has a finger hold 33 allowing the said axial movement. The shaft 23 has an end knob 34 allowing manual rotation of the shaft 23.

The manner of operation of the embodiment shown in FIGS. 1 to 2(d) will now be described. The container 11 is filled with gel by withdrawing the piston 13 away from the outlet 12, and by detaching the cap which forms the outlet 12. The gel is then passed into the container 11 through the end remote from the rotor 16. With the drive rotor 16 in the first operational position, and with the line 17 fully wound on the drive rotor 16, the container 11 is positioned close to the fixed location 19 to commence laying of a trail of gel in a preformed furrow. In this state the piston 13 is set at the far end of the container 11 from the opening 12, and the container 11 is full of gel and seed suspension. The container 11 is then carried manually away from the fixed location 19 and as the line 17 unwraps from the drive rotor 16, the rotor drives through the pawl 24 the shaft 23 in rotation. This in turn rotates the lead screw 14 which drives the piston 13 axially along the container 11 and expresses through the outlet 12 the gel to form the required trail of seeds along the furrow. At the end of the row when it is desired to rewind the line 17 the operator walks back to the location 19 and at the same time rewinds the drive rotor 16 by inserting a finger in the space beside the finger hold 33 and rotating the finger hold 33 in the reverse direction from the unwind direction. During this rewind the pawl 24 freewheels over the ratchet configuraion 21 so that the line can be rewound without disturbing the piston 13.

If at the beginning of a line of gel, it is desired to produce a "test" flow from the outlet 12, the finger hold 33 is brought axially to the right in FIG. 2(a) to disengage the pawl 24, and the knob 34 is then rotated manually to produce the required movement of the plunger 33 without moving the drive rotor 16. This disengaged position of the drive rotor 16 may also be used when it is desired to re-position the piston 13 for refilling the container 11.

Figure 1:
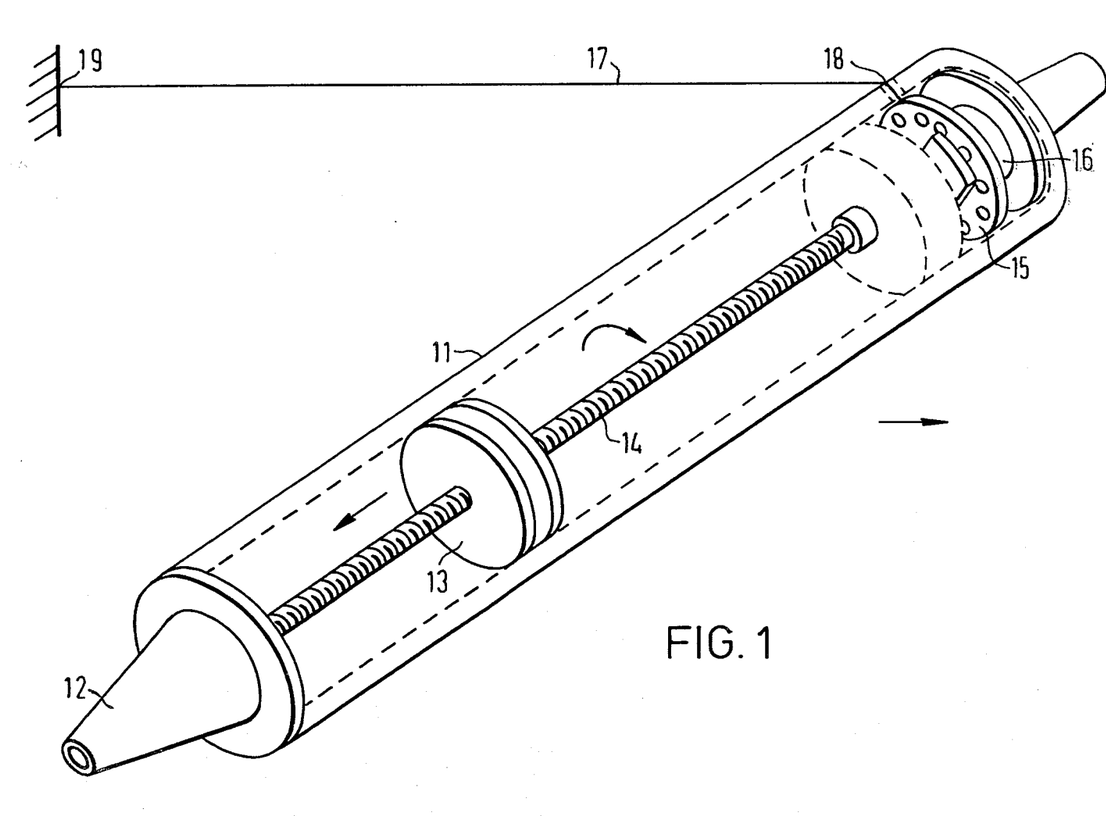
FIG. 1 is a perspective view in diagrammatic form of apparatus for dispensing seeds in a gel embodying the present invention.
Figure 2D:
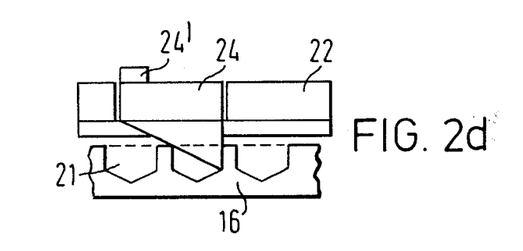
FIG. 2(d) is a side view of a pawl in FIG. 2(a)
Figure 3:
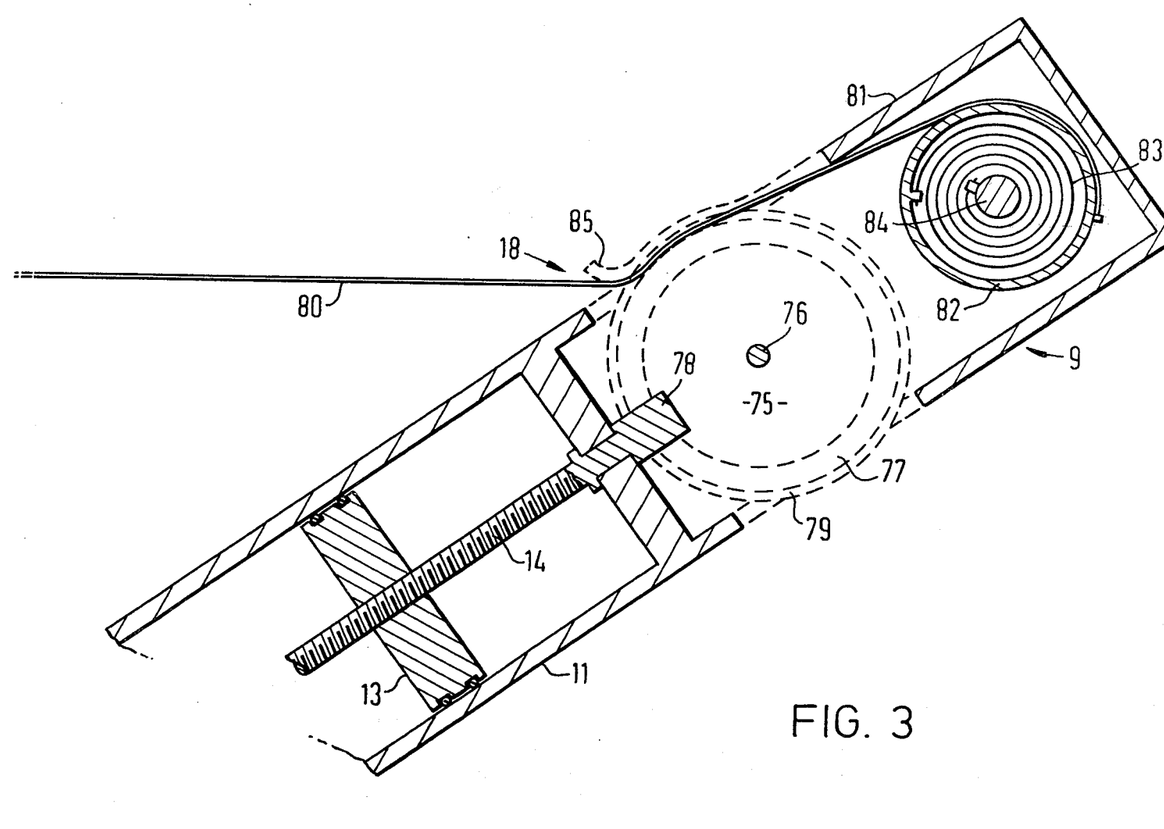
FIGS. 3, 4 and 5 are longitudinal sections of alternative forms of the apparatus shown in FIG. 1.

In FIG. 3 there is shown an alternative form of drive means which may be provided in the apparatus shown generally in FIG. 1. In the apparatus shown in FIG. 3, there is mounted at the end of the container 11 a drive rotor constituted by a drive disc 75 mounted for rotation about a central spindle 76 which is positioned along the axis of the lead screw 14 but at right angles thereto. The drive disc 75 carries a cog track 77 formed on the face of the disc 75 and cooperating with a gear 78 on the end of the lead screw 14. The outer perimeter 79 of the gear disc 75 cooperates with a metering member 80 which may be for example a plain tape or belt, or the disc 75 may carry around its perimeter a sprocket track having outwardly directed teeth which cooperate with perforations in a tape. Thus the metering member 80 may engage with the rotor 75 by friction or by cooperating teeth and perforations.

The metering member 80 is received into a housing 81 of the drive means through an opening indicated generally at 18, and is wound onto a spool 82. The spool 82 is spring loaded by a spiral spring 83 attached to a central shaft 84 of the spool 82. Between entering the opening 18 and being wound on to the spool 82, the metering member 80 is urged by a wheel or biassing means 85 against the perimeter 79, and is arranged to follow around the perimeter 79 over an arc of about 45° before passing to the take up spool 82.

In operation the apparatus is initially provided with the member 80 fully wound on to the spool 82, and the spring 83 fully unwound. The free end of the member 80 is then secured at a fixed location relative to the working surface, and the container 11 is moved along a linear path away from the fixed rotation. As the container 11 moves, the member 80 is unwound from the spool 82 and rotates the gear disc 75 by cooperation of the perimeter 79 with the member 80. The gear disc 75 in turn rotates the lead screw 14 which causes the plunger 13 to express the gel and seeds out of the container 11 as has been described hereinbefore with reference to the embodiment of FIG. 2.

Figure 4:
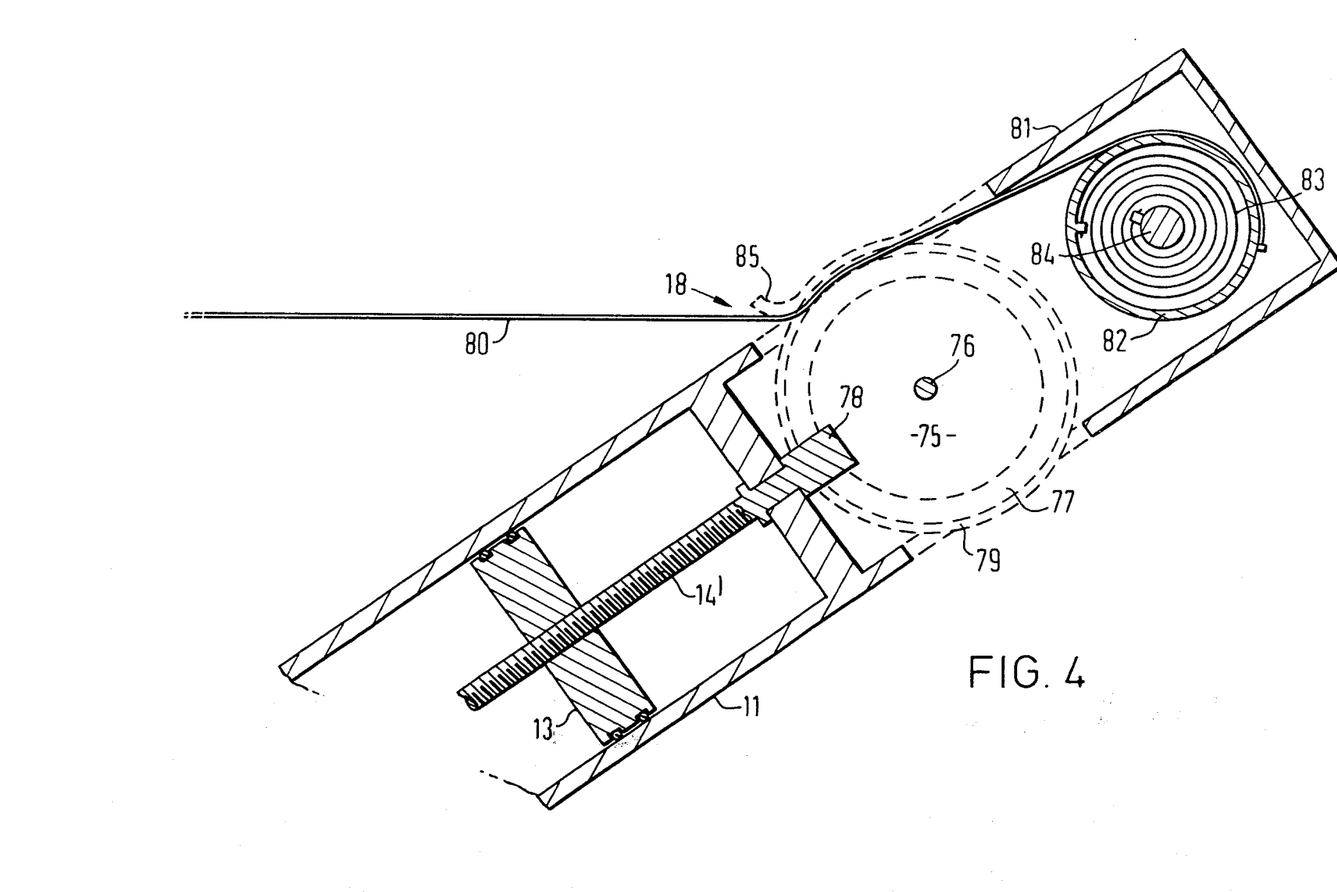

In FIG. 4 there is shown a modification of the apparatus of FIG. 3 in which the sense of the thread on the lead screw 14' is reversed relative to the lead screw 14 in FIG. 3. Other elements are indicated by reference numerals corresponding to FIG. 3. The effect of the reversal of the lead screw thread is that movement of the piston 13 along the container 11 to express material is achieved not by drawing the metering member 80 out of the housing 81, but by allowing the member 80 to enter the housing 81 under the effect of the spring 83.

Thus in operation the embodiment of FIG. 4 is used by producing an initial state in which the container 11 is full of gel, the spool 82 is fully unwound, and the spring 83, is fully wound. The free end of the member 80 is then secured at a fixed location and the member 80 is stretched along the ground to be planted. The container 11 is then moved towards the fixed location so that the restraint applied by the member 80 on the control rotor 75 is progressively released, allowing the rotor 75 to rotate under the influence of the spring 83. This rotation causes the lead screw 14 to rotate and move the piston 13 to express the gel out of the container outlet.

Figure 5:
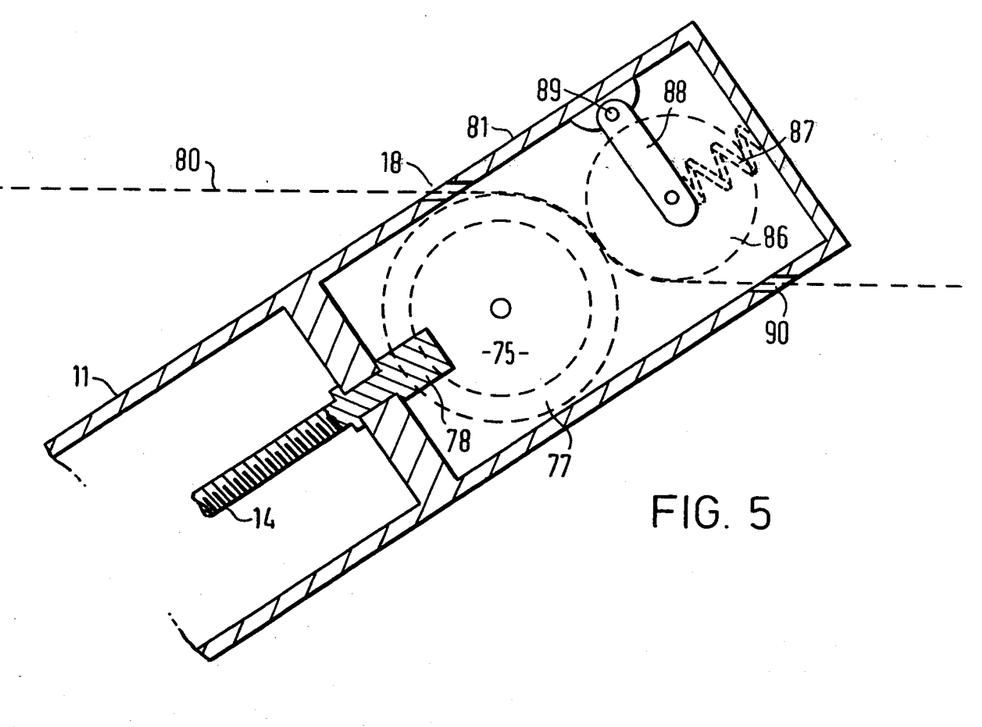

FIG. 15 illustrates a further modification of the apparatus of FIG. 3, and in FIG. 5 like elements are indicated by like reference numerals. The gear disc 75 is provided with the cog track 77 (as in FIG. 3) and at the outer perimeter 79 there is provided a soft resilient outer circumferential surface around which a metering member 80 is guided after entering the housing 81 at the opening 18. Opposite the gear disc 75 is positioned a pinch wheel 86 which also has a soft resilient outer circumferential surface, and which is urged against the gear disc 75 by a spring 87. The spring 87 acts against a lever 88 upon which the pinch wheel 86 is mounted and which in turn is pivotally mounted on the housing 81 at a pivot 89. After passing between the gear disc 75 and the pinch wheel 86, the metering member 80 passes out of the housing 81 through an opening 90.

In the arrangement of FIG. 5, the metering member 80 can be any flexible metering member, and conveniently may be a tape, string, cord, rope or the like. In operation the metering member 80 is threaded between the gear disc 75 and the pinch wheel 86 and is stretched out across the working surface with the ends of the member 80 secured at spaced apart fixed locations with the member 80 generally held taut across the working surface. The container 11 is then filled with seed and gel and the container is moved across the working surface from one fixed location to the other. During this movement, the metering member 80 is gripped between the gear disc 75 and the pinch wheel 86 and the movement of the container causes metering member 80 to rotate the gear disc 75. This in turn rotates the lead screw 14 and causes expulsion of the seed and gel and has been described with reference to previous embodiments.

Figure 6A:
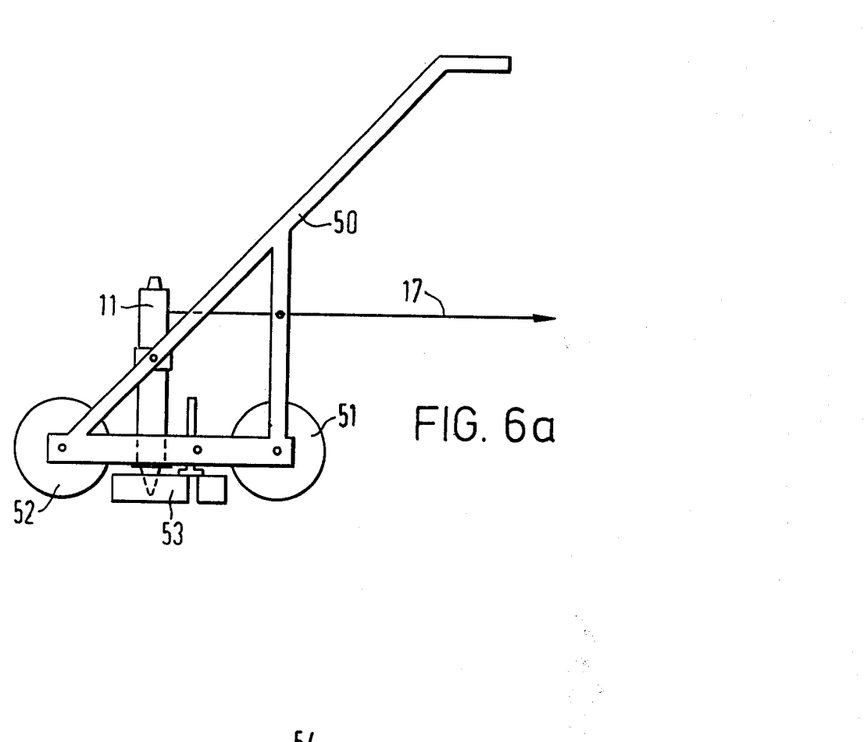
FIGS. 6(a) and 6(b) are side views in diagrammatic form of a mobile modification of the apparatus in FIG. 1.
Figure 6B:
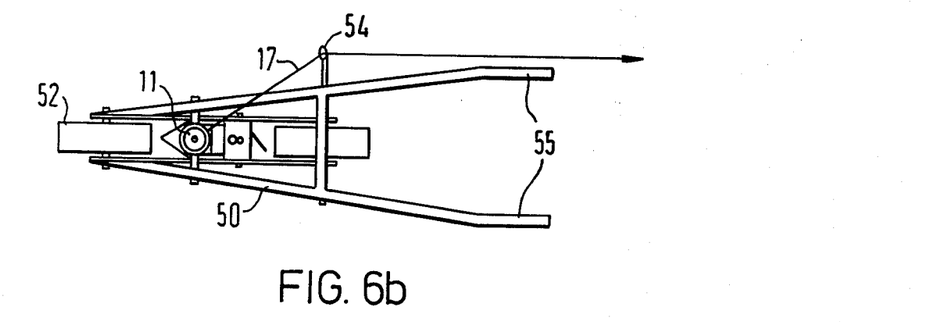

In FIGS. 6(a) and 6(b) there is shown in side view and plan view respectively a diagrammatic representation of the dispensing apparatus described in FIG. 1 when mounted on a frame 50. Frame 50 carries land wheels 51 and 52 and supports a furrow opener 53. As shown, the container 11 is positioned to deposit seed gel immediately behind the furrow opener 53. The line 17 conveniently passes through a guide 54 mounted on the frame 50 so as to avoid fouling the handles 55 which are provided for propelling the frame 50.

It is to be appreciated that many variations of the embodiments described may be provided within the scope of the invention, such variations for example combining different features of the alternative embodiments previously described. In particular, the apparatus shown in FIG. 1 may be adapted to operate by movement towards the fixed location 19 rather than away from the location. This can be arranged by reversing the sense of the thread on the lead screw 14 (or more simply by reversing the sense of winding of the line on the rotor 16), and by providing a spring corresponding to the spring 83 of FIG. 4 attached to the rotor 16. In such a modification the apparatus would commence (as in FIG. 4) with the spring fully wound and the line fully unwound, and the container would be moved towards the location 19, allowing the spring to unwind itself while winding up the line. The lead screw in such a case is powered by the spring, and the rotor 16 acts as a control rotor allowing controlled release of a restraint on the lead screw.

Figure 7A:
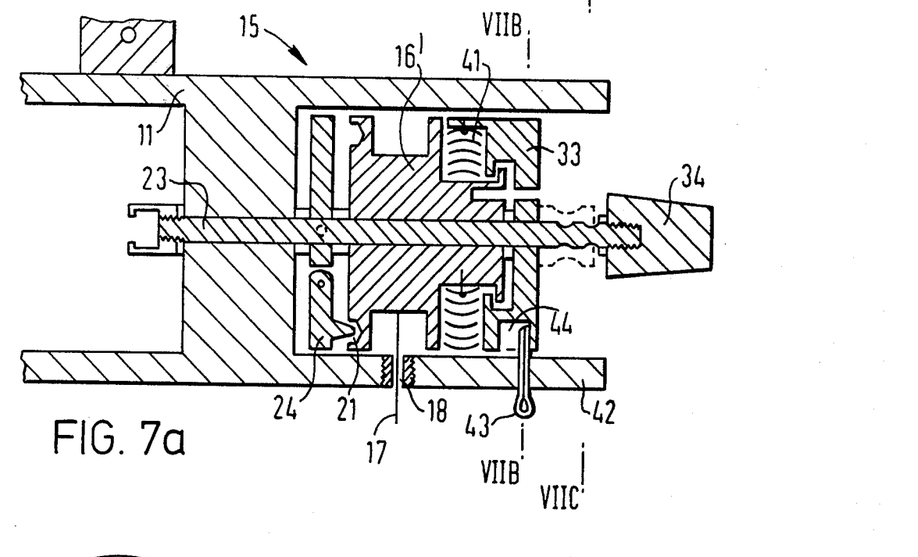
FIGS. 7(a) and 7(d) are a longitudinal section and rear view respectively of a modification of the apparatus shown in FIGS. 1 to 2(d)
Figure 7B:
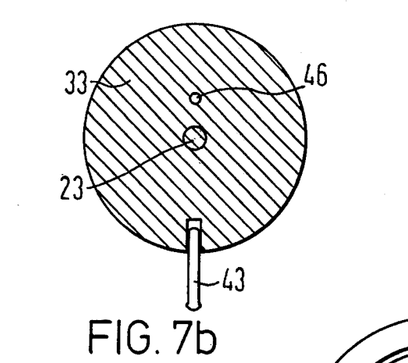
FIGS. 7(b) and 7(c) are cross sections along lines VIIB—VIIB and VIIC—VIIC in FIG. 7(a)
Figure 7C:
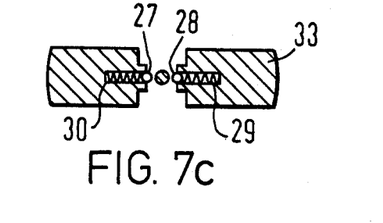
Figure 7D:
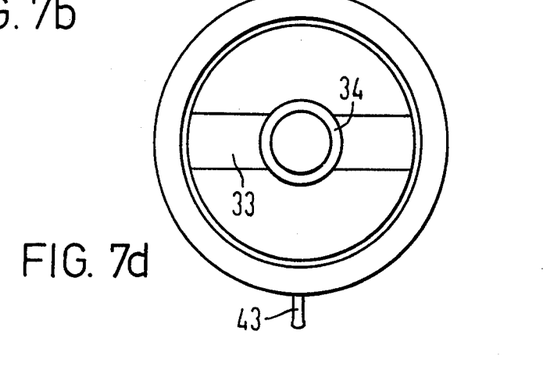

One arrangement of such a modification is shown in FIGS. 7(a) to 7(d) which illustrate a modification of the apparatus shown in FIG. 1. Elements in FIGS. 7(a) to 7(d) which correspond to elements in FIGS. 1 and 2(d) are indicated by like reference numerals. In FIG. 7(a) only the end of the container 11 which houses the driving mechanism is shown, the remainder of the apparatus corresponding to that shown in FIG. 1.

In the embodiment of FIG. 7(a), the drive rotor 16 of FIG. 1 is replaced by a control rotor 16' which operates in the same manner as the control rotor 75 in FIG. 4. The construction of the clutch 15 is also modified from that shown in FIGS. 2(a) to 2(d) in that the control rotor 16' is formed separately from the finger hold 33 and is coupled thereto by a coil spring 41. When it is desired for the control rotor 16' to be driven by the spring 41, the finger hold 33 is fixedly secured relative to a rearward extension 42 of the container 11 by means of a pin 43 passing through a hole in the extension 42 and being located in a recess 44 in the finger hole 33. Otherwise the construction is similar to FIG. 2(a).

In operation the container 11 is filled with gel with the piston 13 (not shown in FIG. 7(a)) at the end remote from the outlet. The line 17 is fully wound upon the rotor 16' and the spring 41 is fully unwound. The free end of the line 17 is secured at a fixed location and the dispenser is pulled away from the fixed location to unwind the line from the rotor 16'. During this unwinding the pin 43 is in the aperture 44 and the sense of operation of the ratchet 24 and the sense of unwinding of the line 17 are arranged to be such that the lead screw 23 remains stationary and the spring 41 is wound by the unwinding of the line 17. The container 11 is then set up for operation, and gel is dispensed by moving the container 11 back towards the fixed location. During this movement the control rotor 16' is urged in rotation by the wound spring 41 and is restrained by the line 17. Rotation of the rotor 16' is effected by relative movement between the line and the container 11 (including the outlet) to produce controlled release of the restraint on the control rotor 16'.

Figure 8:
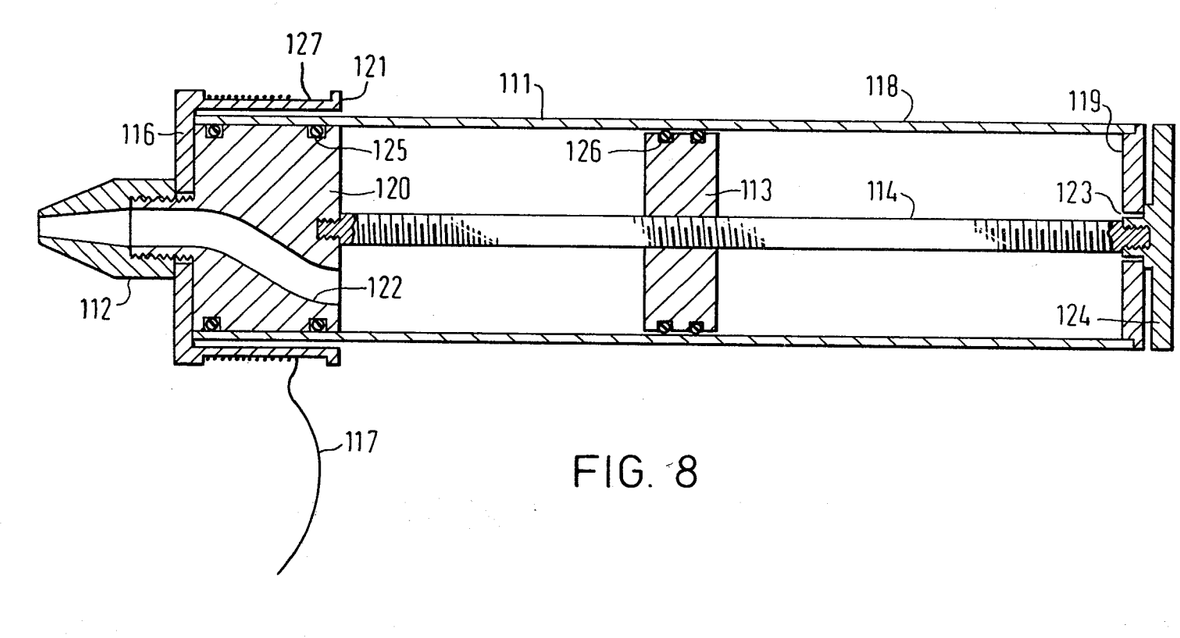
FIG. 8 shows a further modification of the apparatus of FIG. 1.

In FIG. 8 there is shown a further modification of the apparatus shown in FIG. 1. A container 111 comprises a barrel 118 closed at one end by a fixed end cap 119 and at the other end by a rotatable drive rotor 116 formed by an inner body 120 fixed to an outer sleeve 121. A nozzle outlet 112 is fixedly secured to the rotor 116 and the outlet communicates with the interior of the container 111 through a passageway 122 leading through the body 120. A lead screw 114 is fixedly secured to the rotor 116 at the body 120 and engages on its thread a piston 113. The lead screw 114 passes through a bearing aperture 123 in the fixed end cap 119 and is fixed itself to a rotatable end cap 124. The body 120 has seals 125 allowing rotation relative to the barrel 118. The piston 113 has seals 126 allowing axial movement of the piston along the barrel but providing sufficient friction to prevent rotation of the piston 113 with the lead screw 114. The line 117 is wound in operation upon the outside of the sleeve 121 on a recessed winding region 127.

The embodiment of FIG. 8 operates in the same general manner as has been described with reference to FIGS. 1 to 2(d). The container 11 is filled by unscrewing the drive rotor 116 from the lead screw 114 leaving the end of the barrel 118 open. With the drive rotor replaced, the line 117 is wound on the sleeve 121, the free end of the line secured at a fixed location, and the container 111 is moved away from the fixed location so as to unwind the line and draw the piston 113 towards the outlet 112 by rotation of the lead screw 114 thus expressing the gel through the outlet.

Obviously, many modifications and variations of the present invention are possible in light of the above teachings. It is therefore to be understood that within the scope of the appended claims, the present invention may be practiced otherwise than as specifically described herein.

I claim:

1. Apparatus for dispensing material comprising:
a container for said material;
output means for expressing said material from said container through an outlet of said container;
a control rotor coupled to said output means in such a manner that rotation of said control rotor causes the output means to express said material through said outlet;
drive means for driving said rotor in rotation; and
an elongate metering member for effecting rotation of said rotor by engagement of said metering member with said rotor and by relative movement between said metering member and said container outlet,
said metering member being engaged with said rotor in such a manner as to tend to restrain rotation of said rotor by said drive means and to effect the required rotation of said rotor in operation by controlled release of said restraint during said relative movement between said outlet and said metering member.

2. A method of dispensing material comprising the steps of:
placing said material in a container having output means for expressing said material from said container through an outlet of said container and a control rotor coupled to said output means in such a manner that rotation of said control rotor causes said output means to express material through said outlet;
applying to said control rotor a force tending to drive said rotor in rotation;

securing an elongate metering member at at least one fixed location;

engaging said elongate metering member with said control rotor in such a manner as to restrain rotation of said rotor;

moving said control rotor relative to said at least one fixed location to produce a relative movement between said outlet and said metering member; and effecting rotation of said rotor by said engagement of said metering member with said rotor and by said relative movement between said metering member and said outlet, said rotation of said rotor being effected by controlled release of said restraint during said relative movement between said outlet and said metering member.

3. Apparatus for dispensing a material which is flowable under pressure, comprising:

a container for said material;

an outlet nozzle movable along a chosen path for dispensing said flowable material from said container along said path;

output means for expressing said flowable material through said outlet nozzle by applying pressure to said material;

a rotor coupled to said output means in such a manner that rotation of said rotor causes said output means to express said material at a controlled rate determined by said rotation of said rotor; and a flexible elongate metering member adapted to be secured at a fixed location and extended along or adjacent to said chosen path of movement of said nozzle, said elongate member being wrapped repeatedly around said rotor and having a free end for securing at said fixed location in such a manner that when said rotor is moved away from said fixed location, said elongate member rotates said rotor and causes said output means to express said material through said nozzle along said chosen path at a controlled rate dependent upon said movement of said nozzle along said path.

4. Apparatus according to claim 3 in which the metering member engages the rotor in such a manner as to effect rotation of the rotor by unwrapping of the metering member in operation, and in which there is provided means for re-winding the metering member onto the rotor after rotation of the rotor to express material from the container.

5. Apparatus according to claim 3 in which the control rotor is a drive rotor for driving the output means to express the material.

6. Apparatus according to claim 5 in which the drive rotor is arranged to be engaged with the metering member in such a manner as to be powered in operation by the said relative movement between the outlet and the metering member.

7. Apparatus according to claim 3 in which the arrangement is such that in operation the rate of expression of material by the output means is substantially proportional to the rate of said relative movement between the outlet and the metering member.

8. Apparatus according to claim 3 in which the output means is arranged to express the material substantially continuously and uniformly in response to substantially continuous and uniform movement between the outlet and the metering member.

9. Apparatus according to claim 3 in which the output means comprises a piston mounted on a lead screw for axial movement along the lead screw to express material through the outlet, the lead screw being coupled to the said rotor for rotation thereby.

10. Apparatus according to claim 3 in which the elongate metering member comprises a line.

11. Apparatus for dispensing a material which is flowable under pressure, comprising:

a container for said material adapted to be hand-held in operation and to be movable along a chosen path for dispensing said flowable material through an outlet nozzle of said container along said path;

output means for expressing said flowable material through said outlet nozzle by applying pressure to said material;

a drive rotor coupled to said output means in such a manner that rotation of said rotor drives said output means to express said material at a controlled rate determined by said rotation of said rotor;

a line adapted to be secured at a fixed location and extended along or adjacent to said chosen path of movement of said continer;

said line being repeatedly wrapped around said rotor and having a free end for securing at said fixed location; and drive coupling means between said rotor and said output means such that when in operation, said rotor is moved away from said fixed location along said chosen path, said line rotates said rotor by unwrapping therefrom and said lines operates both to drive said output means to express said flowable material by means of tension in said line, and also operates to control the rate of said expression of said material in dependence upon said rate of movement of said container along said chosen path.

12. Apparatus according to claim 11 in which the said container contains seeds in a gel.

13. A method of dispensing a material which is flowable under pressure comprising the steps of:

placing said flowable material in a container having output means for expressing said flowable material through an outlet nozzle of said container by applying pressure to said material and having a rotor coupled to said output means in such a manner that rotation of said rotor causes said output means to express said material at a controlled rate determined by said rotation of said rotor;

securing at a fixed location a free portion of a flexible elongate member wrapped repeatedly around said rotor; and moving said rotor with said nozzle away from said fixed location in such a manner as to cause said elongate member to rotate said rotor and thereby cause said output means to express said material through said nozzle along said path of said movement of said nozzle.

14. A method according to claim 13 in which the said control rotor is a drive rotor and the method includes the step of driving the output means to express the material by rotation of the drive rotor.

15. A method according to claim 14 including the step of powering the rotation of the drive rotor by the said relative movement between the outlet and the metering member.

16. A method according to claim 13 including the step of expressing as the said material a gel containing seeds.

17. A method of dispensing seeds dispersed in a gel, comprising the steps of:

placing said seeds and said gel in a hand-held container having output means disposed within said container for expressing said seeds and gel through an outlet nozzle of said container by applying pressure to said seeds and gel and having a rotor coupled to said output means in such a manner that rotation of said rotor drives said output means to express said seeds and said gel through said outlet nozzle at a controlled rate determined by said rotation of said rotor;

securing at a fixed location relative to a chosen path of movement of said outlet nozzle a flexible elongate member adapted to be extended along or adjacent to said chosen path;

engaging said elongate member with said rotor;

moving said container and said rotor by hand along or adjacent to said chosen path away from said fixed location;

rotating said rotor by engagement of said elongate member with said rotor; and expressing said seeds and said gel through said nozzle along said chosen path at a controlled rate dependent upon said movement of said nozzle along said path, the rate of expression of said seeds and gel being controlled by the relative movement between said rotor and said elongate member, and the force driving said output means to express said seeds and gel being provided by tension in said elongate member acting upon said rotor during said movement by hand of said container away from said fixed location.

18. A method according to claim 13 or 17 in which the said elongate metering member comprises a line.

19. Apparatus for dispensing a material which is flowable under pressure, comprising:

a container for housing said material and having an outlet nozzle for dispensing said material from said container, said container being movable along a chosen path along which said material is to be dispensed;

output means disposed within said container for expressing said material through said outlet nozzle by applying pressure to said material;

a control rotor operatively connected to said expressing means for moving said expressing means at a controlled rate in response to rotation of said rotor so as to express said material from said container at said controlled rate; and an elongate metering member having at least one end thereof secured to a fixed location separate and disconnected from said container, said member extending along or adjacent to said chosen path of movement of said container and operatively associated with said rotor such that when said container is moved along said chosen path and relative to said fixed location, said member causes rotation of said rotor which in turn causes movement of said output means whereby said material is dispensed from said container nozzle along said chosen path at said controlled rate dependent upon said movement of said container along said chosen path.

20. Apparatus according to claim 19 in which the elongate metering member is adapted to engage with the rotor by wrapping around the rotor around at least an arc of a path around the rotor.

21. Apparatus according to claim 20 in which the control rotor is arranged for the metering member to be wrapped repeatedly around the rotor to effect rotation of the rotor when in operation a free end of the metering member is secured at a fixed location and the rotor is moved relative to the fixed location.

22. Apparatus according to claim 19 in which the rotor is arranged for the metering member to engage with the rotor in such a manner as to leave both ends of the metering member free of the rotor, the arrangement being such as to effect rotation of the rotor when in operation the free ends of the metering member are secured respectively at two spaced apart locations and the rotor is moved from one fixed location towards the other.

23. Apparatus according to claim 19 including bias means for urging the metering member against the rotor to produce or assist the said engagement of the metering member with the rotor.

24. A method of dispensing a material which is flowable under pressure, comprising the steps of:

placing said flowable material in a container having output means disposed within said container for expressing said flowable material through an outlet nozzle of said container by applying pressure to said material, and having a control rotor operatively connected to said output means such that rotation of said rotor causes movement of said output means for expressing said material from said outlet nozzle of said container at a controlled rate determined by said rotation of said rotor;

operatively engaging a portion of an elongate metering member with said rotor;

securing at least one end portion of said member to a fixed location separate and disconnected from said container; and moving said container along a chosen path relative to said fixed location such that said member causes rotation of said rotor which in turn causes movement of said output means so as to dispense said material from said container nozzle along said chosen path at a controlled rate dependent upon said movement of said container along said chosen path.

25. A method according to claim 24 in which the step of engaging the elongate metering member with the control rotor comprises wrapping the metering member around the rotor around at least an arc of a path around the rotor.

26. A method according to claim 25 in which the step of engaging the elongate metering member with the control rotor comprises wrapping the metering member repeatedly around the rotor, and effecting the said rotation of the rotor by moving the rotor relative to the said fixed location.

27. A method according to claim 26 including the steps of moving the rotor away from the said fixed location and effecting the said rotation of the rotor by unwrapping the metering member from the rotor.

28. A method according to claim 25 including the steps of engaging the elongate metering member with the control rotor in such a manner as to leave both ends of the metering member free of the rotor, securing the free ends of the metering member respectively at two spaced apart locations, and effecting the said rotation of the rotor by moving the rotor from one fixed location towards the other to cause the output means to express material through the outlet.

29. A method according to claim 27 including the step of expressing the material in such a manner that the quantity of material expressed by the output means is substantially proportional to the said relative movement between the outlet and metering member.

30. A method according to claim 27 including the step of expressing the material substantially continuously and uniformly in response to substantially continuous and uniform movement between the container outlet and the metering member.

* * * * *